(12) United States Patent
Marvin (10) Patent No.: US 7,539,985 B2
(45) Date of Patent: May 26, 2009

(54) SYSTEMS AND METHODS FOR DYNAMIC COMPONENT VERSIONING

(75) Inventor: Kyle Marvin, Kingwood, TX (US)

(73) Assignee: BEA Systems, Inc., San Jose, CA (US)

( * ) Notice: Subject to any disclaimer, the term of this patent is extended or adjusted under 35 U.S.C. 154(b) by 1047 days.

(21) Appl. No.: 10/785,780

(22) Filed: Feb. 24, 2004

(65) Prior Publication Data

US 2004/0168153 A1    Aug. 26, 2004

Related U.S. Application Data

(60) Provisional application No. 60/449,961, filed on Feb. 26, 2003.

(51) Int. Cl.
*G06F 9/45* (2006.01)
(52) U.S. Cl. .................................... 717/170
(58) Field of Classification Search ................ 717/170
See application file for complete search history.

(56) References Cited

U.S. PATENT DOCUMENTS

| | | | | |
|---|---|---|---|---|
| 4,558,413 A * | 12/1985 | Schmidt et al. | ............. | 707/203 |
| 5,321,841 A | 6/1994 | East et al. | | |
| 5,469,562 A | 11/1995 | Saether | ......................... | 714/20 |
| 5,604,860 A | 2/1997 | McLaughlin et al. | ........ | 715/866 |
| 5,630,131 A | 5/1997 | Palevich et al. | ............. | 717/108 |
| 5,748,975 A | 5/1998 | Van De Vanter | | |
| 5,801,958 A | 9/1998 | Dangelo et al. | | |
| 5,835,769 A | 11/1998 | Jervis et al. | | |
| 5,836,014 A | 11/1998 | Faiman, Jr. | | |
| 5,867,822 A | 2/1999 | Sankar | | |
| 5,944,794 A | 8/1999 | Okamoto et al. | ............ | 709/225 |

(Continued)

FOREIGN PATENT DOCUMENTS

CA    2 248 634    3/2000

(Continued)

OTHER PUBLICATIONS

Alonso, G., et al., "Advanced Transaction Models in Workflow Contexts", Proceedings of the 12th International Conference on Data Engineering, Feb. 1996, retrieved from: http://citeseer.ist.psu.edu/alonso96advanced.html.

(Continued)

*Primary Examiner*—John Chavis
(74) *Attorney, Agent, or Firm*—Womble Carlyle Sandridge & Rice, PLLC (57) ABSTRACT

The deployment and management of differing versions of software components can be simplified. External interfaces of the component can remain constant in behavior while the internal logic, and possibly internal storage, can change between versions. Such a version management system can be transparent to the client programs, since interfaces can remain backwards compatible between component versions. This transparency can greatly reduce the risks of unpredictable behavior or system failure. A system can maintain each version of a software component, and can use a dispatch technique to determine and instantiate the currently active version whenever a client requests a service from the software component during a session. Old instances, possibly of other versions, can be maintained as long as required on the server. Such systems can apply to stateful and stateless components, using synchronous or asynchronous communications, and which may communicate over networks and may use web services type protocols. This description is not intended to be a complete description of, or limit the scope of, the invention. Other features, aspects, and objects of the invention can be obtained from a review of the specification, the figures, and the claims.

39 Claims, 2 Drawing Sheets

U.S. PATENT DOCUMENTS

| | | | |
|---|---|---|---|
| 5,961,593 A | 10/1999 | Gabber et al. | |
| 5,966,535 A | 10/1999 | Benedikt et al. | |
| 6,012,083 A | 1/2000 | Savitzky et al. | 709/202 |
| 6,016,495 A | 1/2000 | McKeehan et al. | 707/103 R |
| 6,018,730 A | 1/2000 | Nichols et al. | 706/45 |
| 6,023,578 A | 2/2000 | Birsan et al. | 717/105 |
| 6,028,997 A | 2/2000 | Leymann et al. | |
| 6,029,000 A | 2/2000 | Woolsey et al. | |
| 6,044,217 A | 3/2000 | Brealey et al. | |
| 6,067,623 A | 5/2000 | Blakely et al. | |
| 6,070,184 A | 5/2000 | Blount et al. | 709/200 |
| 6,092,102 A | 7/2000 | Wagner | |
| 6,112,024 A * | 8/2000 | Almond et al. | 717/122 |
| 6,119,149 A | 9/2000 | Notani | |
| 6,141,701 A | 10/2000 | Whitney | 710/5 |
| 6,148,336 A | 11/2000 | Thomas et al. | |
| 6,185,734 B1 * | 2/2001 | Saboff et al. | 717/164 |
| 6,212,546 B1 | 4/2001 | Starkovich et al. | 709/203 |
| 6,222,533 B1 | 4/2001 | Notani et al. | |
| 6,226,675 B1 | 5/2001 | Meltzer et al. | |
| 6,230,287 B1 | 5/2001 | Pinard et al. | |
| 6,230,309 B1 | 5/2001 | Turner et al. | |
| 6,237,135 B1 | 5/2001 | Timbol | |
| 6,243,737 B1 | 6/2001 | Flanagan et al. | 709/202 |
| 6,292,932 B1 | 9/2001 | Baisley et al. | 717/114 |
| 6,311,327 B1 | 10/2001 | O'Brien et al. | 717/114 |
| 6,330,569 B1 | 12/2001 | Baisley et al. | 707/203 |
| 6,334,114 B1 | 12/2001 | Jacobs et al. | 705/26 |
| 6,338,064 B1 | 1/2002 | Ault et al. | |
| 6,343,265 B1 | 1/2002 | Glebov et al. | 703/25 |
| 6,353,923 B1 | 3/2002 | Bogle et al. | |
| 6,360,358 B1 | 3/2002 | Elsbree et al. | 717/120 |
| 6,367,068 B1 | 4/2002 | Vaidyanathan et al. | |
| 6,377,939 B1 | 4/2002 | Young | 705/34 |
| 6,408,311 B1 | 6/2002 | Baisley et al. | 707/203 |
| 6,411,698 B1 | 6/2002 | Bauer et al. | 379/207.01 |
| 6,445,711 B1 | 9/2002 | Scheel et al. | 370/402 |
| 6,470,364 B1 | 10/2002 | Prinzing | 715/530 |
| 6,516,322 B1 | 2/2003 | Meredith | 707/102 |
| 6,560,769 B1 | 5/2003 | Moore et al. | 717/100 |
| 6,567,738 B2 | 5/2003 | Gopp et al. | |
| 6,584,454 B1 | 6/2003 | Hummel et al. | 705/59 |
| 6,594,693 B1 | 7/2003 | Borwankar | |
| 6,594,700 B1 | 7/2003 | Graham et al. | 709/230 |
| 6,601,113 B1 | 7/2003 | Koistinen et al. | 719/316 |
| 6,604,198 B1 | 8/2003 | Beckman et al. | |
| 6,609,115 B1 | 8/2003 | Mehring et al. | 705/51 |
| 6,615,258 B1 | 9/2003 | Barry et al. | 709/223 |
| 6,636,491 B1 | 10/2003 | Kari et al. | 370/328 |
| 6,637,020 B1 | 10/2003 | Hammond | 717/107 |
| 6,643,652 B2 | 11/2003 | Helgeson et al. | 707/10 |
| 6,654,932 B1 | 11/2003 | Bahrs et al. | 715/507 |
| 6,662,357 B1 * | 12/2003 | Bowman-Amuah | 717/120 |
| 6,678,518 B2 | 1/2004 | Eerola | 455/422.1 |
| 6,684,388 B1 | 1/2004 | Gupta et al. | 717/136 |
| 6,687,702 B2 | 2/2004 | Vaitheeswaran et al. | |
| 6,687,848 B1 | 2/2004 | Najmi | 714/4 |
| 6,721,740 B1 | 4/2004 | Skinner et al. | |
| 6,721,779 B1 | 4/2004 | Maffeis | 709/202 |
| 6,732,237 B1 | 5/2004 | Jacobs et al. | |
| 6,748,420 B1 | 6/2004 | Quatrano et al. | 709/205 |
| 6,754,884 B1 | 6/2004 | Lucas et al. | 717/108 |
| 6,757,689 B2 | 6/2004 | Battas et al. | |
| 6,789,054 B1 | 9/2004 | Makhlouf | 703/6 |
| 6,795,967 B1 | 9/2004 | Evans et al. | |
| 6,799,718 B2 | 10/2004 | Chan et al. | 235/375 |
| 6,802,000 B1 | 10/2004 | Greene et al. | |
| 6,804,686 B1 | 10/2004 | Stone et al. | |
| 6,823,495 B1 | 11/2004 | Vadula et al. | 715/805 |
| 6,832,238 B1 | 12/2004 | Sharma et al. | 709/201 |
| 6,836,883 B1 | 12/2004 | Abrams et al. | 717/140 |
| 6,847,981 B2 | 1/2005 | Song et al. | 707/104.1 |
| 6,850,979 B1 | 2/2005 | Saulpaugh et al. | 709/225 |
| 6,859,180 B1 | 2/2005 | Rivera | |
| 6,874,143 B1 | 3/2005 | Murray et al. | 717/173 |
| 6,889,244 B1 | 5/2005 | Gaither et al. | 709/202 |
| 6,915,519 B2 | 7/2005 | Williamson et al. | 719/313 |
| 6,918,084 B1 | 7/2005 | Slaughter et al. | 715/513 |
| 6,922,827 B2 | 7/2005 | Vasilik et al. | |
| 6,950,872 B2 | 9/2005 | Todd, II | 717/109 |
| 6,959,307 B2 | 10/2005 | Apte | |
| 6,963,914 B1 | 11/2005 | Breitbart et al. | 709/226 |
| 6,971,096 B1 | 11/2005 | Ankireddipally et al. | 718/101 |
| 6,976,086 B2 | 12/2005 | Sadeghi et al. | 709/236 |
| 7,000,219 B2 | 2/2006 | Barrett et al. | 717/107 |
| 7,017,146 B2 | 3/2006 | Dellarocas et al. | 717/106 |
| 7,043,722 B2 | 5/2006 | Bau, III | 717/151 |
| 7,051,072 B2 | 5/2006 | Stewart et al. | 709/204 |
| 7,051,316 B2 | 5/2006 | Charisius et al. | 717/103 |
| 7,054,858 B2 | 5/2006 | Sutherland | 707/4 |
| 7,062,718 B2 | 6/2006 | Kodosky et al. | 715/771 |
| 7,069,507 B1 | 6/2006 | Alcazar et al. | 715/530 |
| 7,072,934 B2 | 7/2006 | Helgeson et al. | 709/203 |
| 7,073,167 B2 | 7/2006 | Iwashita | |
| 7,076,772 B2 | 7/2006 | Zatloukal | 717/147 |
| 7,089,584 B1 | 8/2006 | Sharma | |
| 7,096,422 B2 | 8/2006 | Rothschiller et al. | 715/513 |
| 7,107,578 B1 | 9/2006 | Alpern | 717/124 |
| 7,111,243 B1 | 9/2006 | Ballard et al. | 715/744 |
| 7,117,504 B2 | 10/2006 | Smith et al. | 709/201 |
| 7,127,704 B2 | 10/2006 | Van De Vanter et al. | 717/112 |
| 7,143,186 B2 | 11/2006 | Stewart et al. | 709/245 |
| 7,146,422 B1 | 12/2006 | Marlatt et al. | |
| 7,155,705 B1 | 12/2006 | Hershberg et al. | |
| 7,165,041 B1 | 1/2007 | Guheen et al. | |
| 7,181,731 B2 | 2/2007 | Pace et al. | |
| 7,184,967 B1 | 2/2007 | Mital et al. | 705/8 |
| 7,240,331 B2 | 7/2007 | Vion-Dury et al. | 717/117 |
| 7,260,599 B2 | 8/2007 | Bauch et al. | |
| 7,260,818 B1 * | 8/2007 | Iterum et al. | 717/170 |
| 2002/0004848 A1 | 1/2002 | Sudarshan et al. | |
| 2002/0010781 A1 | 1/2002 | Tuatini | |
| 2002/0010803 A1 | 1/2002 | Oberstein et al. | |
| 2002/0016759 A1 | 2/2002 | Macready et al. | |
| 2002/0035604 A1 | 3/2002 | Cohen et al. | |
| 2002/0049788 A1 | 4/2002 | Lipkin et al. | |
| 2002/0073236 A1 | 6/2002 | Helgeson et al. | |
| 2002/0073396 A1 | 6/2002 | Crupi et al. | |
| 2002/0078365 A1 | 6/2002 | Burnett et al. | |
| 2002/0083075 A1 | 6/2002 | Brummel et al. | |
| 2002/0111922 A1 | 8/2002 | Young et al. | |
| 2002/0116454 A1 | 8/2002 | Dyla et al. | |
| 2002/0120685 A1 | 8/2002 | Srivastava et al. | |
| 2002/0143960 A1 | 10/2002 | Goren et al. | |
| 2002/0152106 A1 | 10/2002 | Stoxen et al. | |
| 2002/0161826 A1 | 10/2002 | Arteaga et al. | |
| 2002/0165936 A1 | 11/2002 | Alston et al. | |
| 2002/0169644 A1 | 11/2002 | Greene | |
| 2002/0174178 A1 | 11/2002 | Stawikowski | |
| 2002/0174241 A1 | 11/2002 | Beged-Dov et al. | |
| 2002/0184610 A1 | 12/2002 | Chong et al. | |
| 2002/0188486 A1 | 12/2002 | Gil et al. | |
| 2002/0194244 A1 | 12/2002 | Raventos | |
| 2002/0194267 A1 | 12/2002 | Flesner et al. | |
| 2002/0194495 A1 | 12/2002 | Gladstone et al. | |
| 2003/0004746 A1 | 1/2003 | Kheirolomoom et al. | |
| 2003/0005181 A1 | 1/2003 | Bau, III et al. | |
| 2003/0014439 A1 | 1/2003 | Boughannam | |
| 2003/0018661 A1 | 1/2003 | Darugar | |
| 2003/0018665 A1 | 1/2003 | Dovin et al. | |
| 2003/0018832 A1 | 1/2003 | Amirisetty et al. | |
| 2003/0018963 A1 | 1/2003 | Ashworth et al. | |
| 2003/0023957 A1 | 1/2003 | Bau et al. | |
| 2003/0028579 A1 | 2/2003 | Kulkarni et al. | |

| | | | |
|---|---|---|---|
| 2003/0041198 | A1 | 2/2003 | Exton et al. |
| 2003/0043191 | A1 | 3/2003 | Tinsley et al. |
| 2003/0046591 | A1 | 3/2003 | Asghari-Kamrani et al. |
| 2003/0051066 | A1 | 3/2003 | Pace et al. |
| 2003/0055868 | A1 | 3/2003 | Fletcher et al. |
| 2003/0055878 | A1 | 3/2003 | Fletcher et al. |
| 2003/0074217 | A1 | 4/2003 | Beisiegel et al. |
| 2003/0079029 | A1 | 4/2003 | Garimella et al. |
| 2003/0084203 | A1 | 5/2003 | Yoshida et al. |
| 2003/0110117 | A1 | 6/2003 | Saidenberg et al. |
| 2003/0110446 | A1 | 6/2003 | Nemer |
| 2003/0126136 | A1 | 7/2003 | Omoigui |
| 2003/0149791 | A1 | 8/2003 | Kane et al. |
| 2003/0167358 | A1 | 9/2003 | Marvin et al. |
| 2003/0196168 | A1 | 10/2003 | Hu |
| 2004/0019645 | A1 | 1/2004 | Goodman et al. |
| 2004/0040011 | A1 | 2/2004 | Bosworth et al. |
| 2004/0078373 | A1 | 4/2004 | Ghoneimy et al. |
| 2004/0103406 | A1 | 5/2004 | Patel |
| 2004/0133660 | A1 | 7/2004 | Junghuber et al. |
| 2004/0148336 | A1 | 7/2004 | Hubbard et al. |
| 2004/0204976 | A1 | 10/2004 | Oyama et al. |
| 2004/0216086 | A1 | 10/2004 | Bau |
| 2004/0225995 | A1 | 11/2004 | Marvin et al. |
| 2004/0260715 | A1 | 12/2004 | Mongeon et al. |
| 2005/0050068 | A1 | 3/2005 | Vaschillo et al. |
| 2005/0278585 | A1 | 12/2005 | Spencer |
| 2006/0206856 | A1 | 9/2006 | Breeden et al. |
| 2006/0234678 | A1 | 10/2006 | Juitt et al. |
| 2007/0038500 | A1 | 2/2007 | Hammitt et al. |

FOREIGN PATENT DOCUMENTS

| | | |
|---|---|---|
| WO | WO 99/23558 | 5/1999 |
| WO | WO 00/29924 | 5/2000 |

OTHER PUBLICATIONS

Van Der Alst, WMP, et al., "XML Based Schema Definition for Support of Inter-organizational Workflow", University of Colorado and University of Eindhoven report, 2000, retrieved from: http://citeseer.ist.psu.edu/vanderaalst00xml.html.
Plaindoux, D., "XML Transducers in Java", Proceedings of the 11th International World Wide Web Conference, Sheraton Waikiki Hotel, Honolulu, HI, USA, May 2002, retrieved from: http://www2002.org/CDROM/poster/132/index.html.
Supplemental European Search Report, EPO2784131.1-1234-PCT/US0233098, dated Aug. 8, 2007, 4 pages.
Microsoft, "Microsoft.net Framework", Microsoft Corporation, 2001, 54 pages.
Willink, "Meta-Compilation for C++", University of Surrey, Jan. 4, 2000, 379 pages.
Sun Microsystems: "J2EE™ Connector Architecture 1.0", XP-002442954, Aug. 2001; retrieved from the Internet: URL: http://java.sun.com/j2ee/connector/download.html>.
BEA, "Transforming Data Using Xquery Mapper", BEA AquaLogic Service Bus. 2.0 Documentation, 2006, pp. 1-19.
Stylus Studio, "Xquery Mapper", Stylus Studio®, Jun. 5, 2007, pp. 1-6; http://www.stylusstudio.com/xquery_mapper.html.
Altova, "XML-to-XML Mapping", Altova MapForce®, 2007, pp. 1-3.
Jamper, "Jamper-Java XML Mapper", Sourceforge.Net®, Jun. 6, 2007, pp. 1-4; http://jamper.sourceforge.net/.
Erich Liebmann, et al., "Adaptive Data Dissemination and Caching for Edge Service Architectures Built with the J2EE", Mar. 2004, ACM Press, 2004 ACM Symposium on Applied Computing, pp. 1717-1724.
Kunisetty, Workflow Modeling and Simulation Using an Extensible Object-Oriented Knowledge Base Management System, CiteSeer, 1996, pp. 1-60, entire reference.
Van Der Aalst et al, Verfication of XRL: An XML-Based Workflow Language, IEEE, Jul. 2001, pp. 427-432, entire reference.
Blake, Rule-Driven Coordination Agents: A Self-Configurable Agent Architecture for Distributed Control, IEEE, Mar. 2001, pp. 271-277, entire reference.
Dahalin et al, Workflow Interoperability Using Extensible Markup Language (XML), IEEE, Jul. 2002, pp. 513-516, entire reference.
Introducing Microsoft DotNet, by Christopher Lauer, Jul. 2, 2002, http://web/archive.org/web/20020702162429/http://www.freevbcode.com/ShowCode.asp?ID=2171.
International Search Report, PCT/US04/05479, mailed Dec. 3, 2004, 3 sheets.
International Search Report, PCT/US04/05488, mailed Mar. 1, 2005, 3 sheets.
Muller, "Event-Oriented Dynamic Adaptation of Workflows: Model, Architecture and Implimentation", 2002, 351 pages, University of Leipzig, Germany.
Peltz, "Web Services Orchestration" Hewlett-Packard, Jan. 2003, 20 pages.
Ort et al., "Java Architecture for XML Binding (JAXB)", Sun Microsystems, Inc., Mar. 2003, retrieved from <http://java.sun.com/developer/technical/articles/WebServices/jaxb>, pp. 1-14.
Wikipedia (redirected from JAXB), "Java Architecture for XML Binding (JAXB)", Oct. 12, 2007, pp. 1-3.
Shannon, "Java™ 2 Platform Enterprise Edition Specification, v1.3", Sun Microsystems, Inc., Proposed Final Draft Oct. 20, 2000, Chapters 1-11, 170 pages.
Int'l Search Report for PCT/US04/05427, Feb. 10, 2005, PCT.
Int'l Search Report for PCT/US04/05479, Dec. 3, 2004, PCT.
Sosnoski, "XML and Java Technologies: Data Binding, Part 1: Code Generation Approaches—JAXB and More", IBM, Jan. 1, 2003, pp. 1-11; http://www-128.ibm.com/developerworks/library/x-databdopt/index.html.
Chen, et al., "eCo Architecture for Electronic Commerce Interoperabillity", CommerceNet Framework Project, Jun. 29, 1999, © 1999 by CommerceNet, Inc., pp. 1-107.
Embury, S.M., et al., "Assisting the Comprehension of Legacy Transactions", Proceedings of the Eighth Working Conference on Reverse Engineering, Oct. 2-5, 2001, © 2001 IEEE, pp. 345-354.
Mays, E., et al., "A Persistent Store for Large Shared Knowledge Bases", IEEE Transactions on Knowledge and Data Engineering, Mar. 1991, vol. 3, Issue 1, © 1991, pp. 33-41.
Tang, C., et al., "Integrating Remote Invocation and Distributed Shared State", Proceedings of the 18th International Parallel and Distributed Processing Symposium, (IPDPS '04), © 2004 IEEE, Apr. 26-30, 2004, 10 pages.
Java Debug Interface-definition, retrieved from <URL http://java.sun.com/j2se/1.4.2/docs/guide/jpda/jdi/overview-summary.html on Feb. 21, 2007, pp. 1-3.
Kilgore, R.A., "Multi-Language, Open-Source Modeling Using the Microsoft.NET Architecture", Proceedings of the Winter Simulation Conference, Dec. 8-11, 2002, © 2006, IEEE, pp. 629-633.
HP, "HP Application Server Developer's Guide, Version 8.0", © 1999-2001, Hewlett-Packard Company, Palo Alto, California, pp. 27-81, 127-160, 195-271.
Bogunovic, N., "A Programming Model for Composing Data-Flow Collaborative Applications", R. Boskovic Institute, Zagreb, 10000, Croatia, IEEE, Mar. 1999, 7 pages, retrieved Apr. 10, 2007.
Sung, S.Y., et al., "A Multimedia Authoring Tool for the Internet", © 1997 IEEE, pp. 304-308, retrieved Apr. 10, 2007.
Smith, M., et al., "Marching Towards a Software Reuse Future", ACM Ada Letters, vol. XIV, No. 6, Nov./Dec. 1994, pp. 62-72, retrieved Apr. 10, 2007.
Mohan, C., et al, "Aries: A Transaction Recovery Method Supporting Fine-Granularity Locking and Partial Rollbacks Using Write-Ahead Logging", © 1992, ACM Transactions on Database Systems, vol. 17, No. 1, Mar. 1992, pp. 94-162.

* cited by examiner

Figure 1

SYSTEMS AND METHODS FOR DYNAMIC COMPONENT VERSIONING

CLAIM OF PRIORITY

This application claims priority from the following application, which is hereby incorporated by reference in its entirety:

U.S. Provisional Patent Application No. 60/449,961, entitled "Systems and Methods for Dynamic Component Versioning" by Kyle Marvin, filed Feb. 26, 2003.

COPYRIGHT NOTICE

A portion of the disclosure of this patent document contains material which is subject to copyright protection. The copyright owner has no objection to the facsimile reproduction by anyone of the patent document of the patent disclosure, as it appears in the Patent and Trademark Office patent file or records, but otherwise reserves all copyright rights whatsoever.

FIELD OF THE INVENTION

The present invention relates to the versioning of software and software components.

BACKGROUND

Developers and system administrators face a continuing problem of maintaining version compatibility between the versions of a software component currently serving a request from a client and new versions of the component newly deployed into the operational software environments. A mismatch in versions between what the client are using and what have been deployed since the request from the client was received can lead to unpredictable behavior and usually system failure. Further complicating the version management issue is the fact that the entity deploying the versions of the software component may have no control over the versions have been instantiated and are currently serving the client. Therefore, any changes in versions of the software component must be carefully managed, otherwise they cannot be ensured to work correctly.

DETAILED DESCRIPTION

The invention is illustrated by way of example and not by way of limitation in the FIGURES of the accompanying drawings in which like references indicate similar elements. It should be noted that references to "an" or "one" or "some" embodiment in this disclosure are not necessarily to the same embodiment, and such references mean at least one.

Systems and methods in accordance with the present invention can simplify the deployment and management of differing versions of a software component. The external interfaces of the software component can remain backwards compatible in behavior while the internal logic, and possibly internal storage, can change between versions. The software component versioning system can be transparent to the programs used by a client since interfaces can remain backwards compatible between component versions. This transparency can greatly reduce the risks of unpredictable behavior or system failure. The system can maintain each version of a software component and can use dispatch techniques to determine the currently active version whenever a client requests a service for the software component during a session. Old instances, possibly of other versions, are maintained as long as required. Such systems can apply to stateful and stateless components, using synchronous or asynchronous communications, which may communicate over networks and may use web services type protocols.

Figure 1:
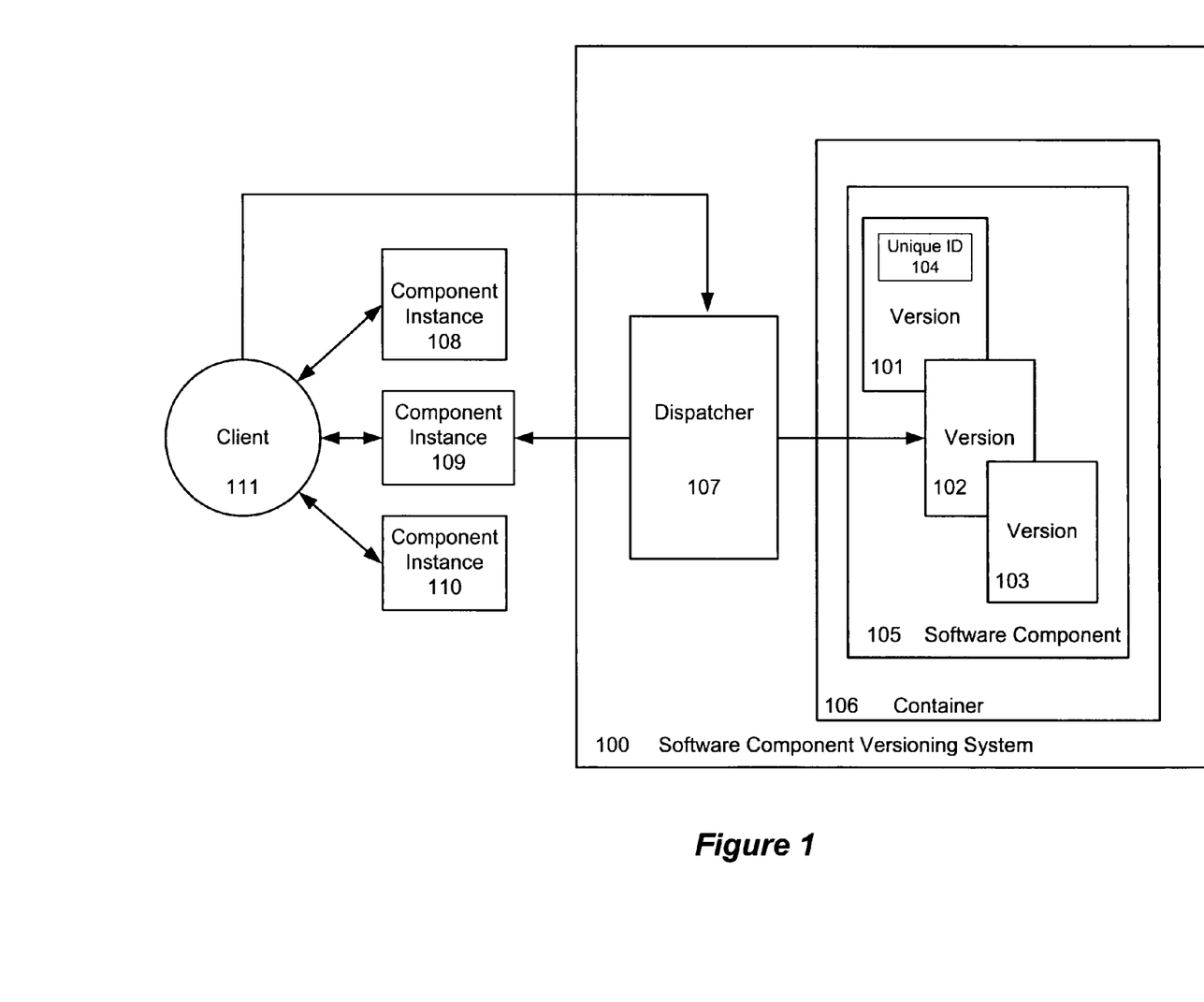
FIG. 1 is a diagram showing a software component versioning system that can be used in accordance with one embodiment of the present invention.

FIG. 1 is an illustration of a software component versioning system 100 in one embodiment of the present invention. Although this diagram depicts components as functionally separate, such depiction is merely for illustrative purposes. It will be apparent to those skilled in the art that the components portrayed in this FIGURE can be arbitrarily combined or divided into separate software, firmware and/or hardware components. Furthermore, it will also be apparent to those skilled in the art that such components, regardless of how they are combined or divided, can execute on the same computing device or multiple computing devices, and wherein the multiple computing devices can be connected by one or more networks.

In the software component versioning system 100 as shown in FIG. 1, differing versions 101-103 of a software component 105 are maintained in a container 106, which is capable of managing and deploying multiple versions of the software component in a runtime environment. The software component is capable of providing a certain service requested by a client 111; such service request may come from the client running software that can be but are not limited to, Web services, client software, embedded systems, server software, and other suitable software. Once the container has deployed a new version of the software component, a unique identifier 104 is assigned to the version and clients can request the services of a deployed software component at any time using said identifier. Once a client initiates a new session requesting a service from that software component, a dispatcher 107 selects a version of the software component currently set as active and creates an instance 108 of the requested software component to serve the client. The dispatcher uses the currently active version of the software component for new sessions, but will continue to use older versions for existing sessions. It uses the unique ID to continue communications between the client and the correct version of the software component for the duration of a running session and will continue to maintain a running instance of the software component until the clients chooses to retire it. Multiple instances 108-110 of different versions of a software component can be running alive at the same time.

Figure 2:
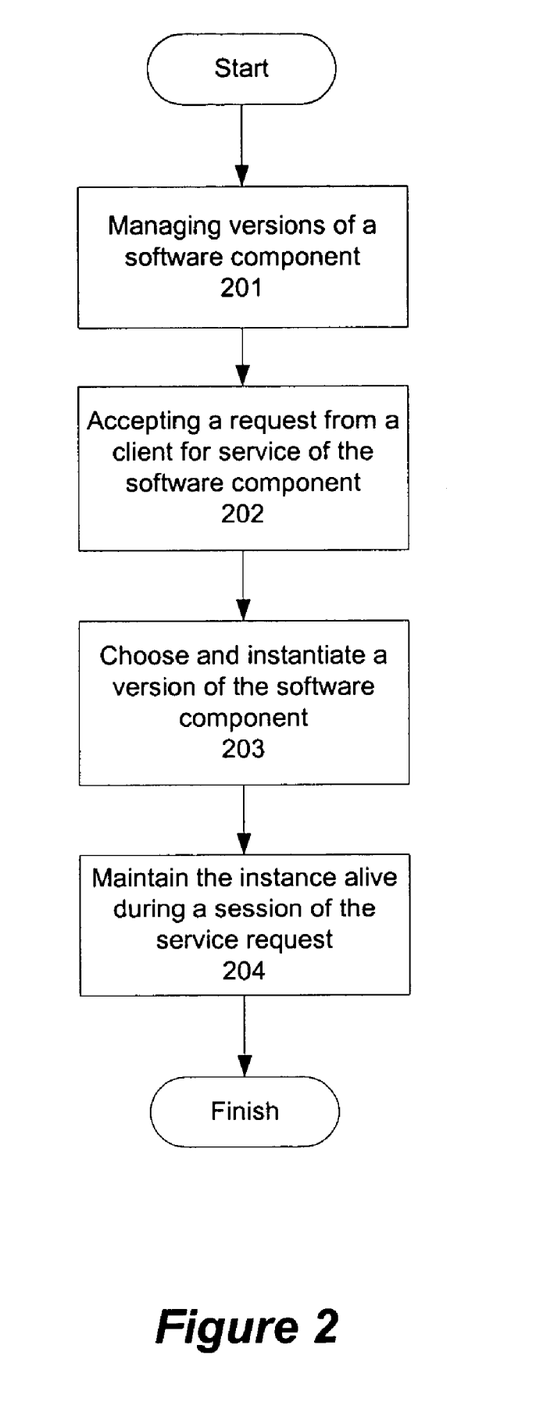
FIG. 2 is a flow chart illustrating a software component versioning process in accordance with one embodiment of the present invention

FIG. 2 is a flow chart illustrating a software component versioning process in accordance to one embodiment of the invention. Although this FIGURE depicts functional steps in a particular order for purposes of illustration, the process is not limited to any particular order or arrangement of steps. One skilled in the art will appreciate that the various steps portrayed in this FIGURE could be omitted, rearranged, combined and/or adapted in various ways Referring to FIG. 2, the container in the versioning system is capable of registering, adding, deploying, and deleting versions of a software component at step 201. Once a request for the service of the software component is received from a client at step 202, the dispatcher in the system will choose a version of the software component and instantiate it at step 203 to serve the client. Then the system will keep such instance alive at step 204 for the duration of the session of the service request from the client.

In some embodiments, the external interfaces of the software component can be used locally or over a network. External network interfaces of the software component can define one or more Web-based services and applications.

In some embodiments, the external interfaces of the software component should be backwards compatible from version to version, i.e., the internal logic of the software component can change in any way that does not alter interface behavior from version to version. If storage is used within the software component, it can change in any way from version to version that does not change the interface behavior. The invention allows newer versions of the software component to support new external interfaces, as long as existing external interfaces are not made incompatible with older versions. Since the external interfaces of the software component are backwards compatible, the version update and management process is transparent to any clients using the services of the software component.

In some embodiments, a new version of a software component can be introduced into the container at deployment time. The new version is deployed into a new location or address and is registered along with version information, with the container. The container creates or updates a table containing: a) a unique identifier for the software component, b) the version of the software component, and c) the location for that version of the software component. The system can also set an indicator for the currently active version for that component. When a service request is received from a client, a new instance of the active version of the software component can be created.

In some embodiments, unused versions of a software component can be removed from the container. The system indicates which version or versions can be removed. The version or versions are only removed once the table indicates they are no longer in use.

One basic goal of software component versioning system is to enable the redeployment of compatible versions of runtime software components. Over the lifecycle of a production-deployed software component, its implementation may need to change over time, either in response to defects in the software component or in response to new requirements. This involves changing both the implementation code and the internal state representation for a software component. When a new upgrade version is deployed, all existing in-flight component instances will continue to use the old code/state representation, and any component instances created after deployment will begin to use the new component implementation. Incompatible changes can include any change that modifies the external behaviors (contract) of the software component, as opposed to the internal state representation or implementation. For web services (JWS/JWS), this contract can be represented by the WSDL associated with the software component. For Java callable components (JBCX/JBC), this contract is the public Java interface associated with the software component.

Differing embodiments of the invention may employ a number of alternate strategies during a dispatch cycle to instantiate a software component in a runtime environment. Two possible strategies are known as: "early branch versioning" and "late branch versioning". A dispatcher can employ either early branch versioning or late branch versioning to instantiate the version of a software component to use when a request is received from a client.

Some embodiments can employ early branch versioning, wherein the dispatch decision on how to instantiate a version of the component in satisfying a given request is determined very early in the dispatch cycle. The request is examined, the unique ID is extracted, and a database or version table lookup is done to identify the particular version of the software component to instantiate in satisfying the request. In this model, parallel infrastructure or components (i.e. beans, queues, DB tables) are deployed inside of the container (i.e. a Java EAR), with disjoint infrastructure available for each deployed version. The "early branch" approach will have code at the front door of the dispatch process parse the request, select an appropriate dispatcher bean from an available set, and dispatch the request into the version-specific infrastructure. Early branch versioning may create some side effects:

1. In some cases, platform infrastructure, such as J2EE infrastructure may need to be replicated. Beans, queues, and other J2EE resources used to support software components are not lightweight, and early versioning implies that not only can this create infrastructure overhead on a per-component basis but on a per-version basis. Further, server startup time and application redeployment time can increase, as the total number of deployed J2EE resources grows as a side effect of versioning updates.
2. The use of early dispatch can require multiple database hits for the same request. The initial lookup for unique ID and version ID mapping can require one database hit or table lookup as well as a downstream access to actually load the version-specific data. In some embodiments, this operation can be reduced to one lookup.
3. For some embodiments, early dispatch works well for versioning top-level components (e.g. JWS/JWF) and not for nested components (e.g. JBCX/JBC). Since the replication is done at the highest level of dispatch (i.e. the top-level), this type of versioning best supports versioning of top-level component types. In some embodiments a different dispatch technique may be required for components lower in the hierarchy.

A system in accordance with one embodiment employs late branch versioning, wherein the dispatch decision on how to instantiate a version of the component in satisfying a given request is determined very late in the dispatch cycle. The request can be processed using a dispatcher that is largely common for all compatible versions of the component, and the branch point doesn't occur until a specific component instance is required in memory (i.e. instantiation for a new component instance, or load time for an existing component instance).

Late branch versioning may create some side effects, which may need to be accounted for in any particular embodiment. Since instances of multiple versions of a component are potentially available at a very deep and common point in the dispatch architecture, distinct class names may be used for these versions to avoid excessive creation of class loaders on a per-version per-component basis. Conversely, with early branch versioning, same named classes are feasible because they are being used inside of completely distinct J2EE modules, which in term have their own class loader.

One embodiment supporting late branch versioning uses a continuing reliance on Java serialization for persistence support. In some embodiments a distinct source artifact exists in the Integrated Development Environment (IDE) for each available version of the software component. Here, available means that the version is available to dispatch requests or to support asynchronous operations on existing component instances. For example, a project might contain 3 different available versions of the "Foo.jws" service component:

Foo_v1jws (the original version)
Foo_v2jws (an updated v2 version of Foo)
Foo_v3jws (an even more up-to-date version of Foo)

Source artifacts can be compiled down to classes of the same name. In the example above, project compilation can result in the creation of Foo_v1.class, Foo_v2.class, and Foo_v3.class.

In some embodiments, an "upgrade" version change is accomplished by creating a new version (i.e. source artifact). If a user wanted to update Foo_v2.jws, they'd simply make the necessary changes inside of Foo_v2.jws, then rebuild and redeploy the software component. In some embodiments, the final step in creating a new upgrade version can be to change the active version to point to the new version. This effectively says that all new instances of the component will used the upgraded version, while all existing versions will continue to use the version established at component creation.

In some embodiments, there is a set of available versions, and one specific version that is deemed the active version. The active version can be the version of the software component (either top-level or nested component) that will be used by default when the software component is instantiated (either in response to a request to create a component or nested component).

In some embodiments, the mechanism for determining the active version for a specific software component can be pluggable by component type. This approach can enable the system to define their own version selection strategies that are richer than the "use the most recent version" that is the default in some embodiments. This pluggable code can make the decision on a more dynamic basis, such as activating the upgrade at a particular point in time (distinct from the time of deployment) or selecting a workflow version based upon a certain time of the day. The inputs to the decision can be the list of available versions.

In some embodiments, the available versions of a software component are accessed via a single component endpoint. In the example above, this might be /myproject/Foo.jws. If a request targeted at Foo.jws is a "start" request (meaning it creates a new component instance to start a conversation—a communication with the clients on service request), then the active version of the component can be the version that is instantiated. If the request is targeted at an existing conversation, then the process involved in loading the data from the database can automatically select the correct version, since unique classnames are used for different versions and are included in the data stored in the database.

In some embodiments, the table storing state information of conversations (communications) between the client and the system can include a version column in the state table that is written at the time a new instance is created. This version column may not be used directly in the dispatch cycle, but would provide visibility into the available versions necessary to support all existing component instances.

Some embodiments allow the name of the versions to be arbitrary and include a version mapping mechanism as a type of component grouping. This embodiment can be provided as a means for run-time messaging infrastructure to test the core mechanisms that will be used for integration of the system.

Some embodiments provide specific capability to define the relationship between the versions of a top-level component and versions of its nested components, and thus make these relationships predictable. Since in some cases, nested component instances are lazily instantiated, care must be taken to guarantee this predictability. If the selection of the version of a nested component instance is a point-in-time decision at the time of instantiation, it is possible that two different instances of the same version of a top-level component could contain different versions of a nested component, depending upon the relative timing of top-level component instance, nested component version upgrades, and nested component instantiation. To avoid this situation, the system can guarantee at run-time that the active versions of all nested components are selected at the time of top-level component instantiation. This approach guarantees that this version relationship will be preserved for the life of this top-level component instance, even if nested component is upgraded after top-level component creation but prior to instantiation. In some situations, these techniques may not strictly guarantee that all instances of a particular version of a top-level component will use the same versions of nested components. After an upgrade has taken place, any newly constructed instances of top-level components may begin to use the newly upgraded nested component. What is guaranteed is that the lazy instantiation does not play a role in the nested component versioning decision.

In some embodiments, providing this guarantee has the side effect of causing versioning relationship to be tracked as part of per-instance state, adding overhead/size to maintained state on a per-instance basis. Some alternative embodiments may have well defined "version bundles" that apply to all instances and are part of global configuration state, but this may require more user configuration and IDE participation in the versioning process. Some embodiments may use compile-time enforcement of forward serialization compatibility for update versions of a class.

One embodiment may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

One embodiment includes a computer program product which is a storage medium (media) having instructions stored thereon/in which can be used to program a computer to perform any of the features presented herein. The storage medium can include, but is not limited to, any type of disk including floppy disks, optical discs, DVD, CD-ROMs, micro drive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, execution environments/containers, and applications.

The foregoing description of the preferred embodiments of the present invention has been provided for the purposes of illustration and description. It is not intended to be exhaustive or to limit the invention to the precise forms disclosed. Many modifications and variations will be apparent to the practitioner skilled in the art. Embodiments were chosen and described in order to best describe the principles of the invention and its practical application, thereby enabling others skilled in the art to understand the invention, the various embodiments and with various modifications that are suited to the particular use contemplated. It is intended that the scope of the invention be defined by the following claims and their equivalents.

What is claimed is:

1. A computer-implemented system to manage versions of a software component, comprising:
   a microprocessor;
   at least one version of the software component, wherein the software component includes
   at least one external interface and at least one internal logic and/or storage;
   a container capable of deploying the at least one version of the software component; and
   a dispatcher capable of:
      accepting a request from a client for the service of the software component;
      determining which version of the software component to instantiate;
      creating an instance of that version of the software component to serve the client;
      maintaining the instance running during a session of the service request while maintaining instances of different versions of the software component alive at the same time; and
      determining an active version that is associated with the software component with a pluggable mechanism.

2. The system according to claim 1, wherein:
   the software component can be stateful or stateless, using synchronous or asynchronous communication.

3. The system according to claim 1, wherein:
   the software component can be hierarchically structured, including a top-level component and at least one nested component of the top-level component.

4. The system according to claim 3, wherein:
   different instances of one version of the top-level component could contain the same or different versions of at least one of the nested component of the top-level component.

5. The system according to claim 3, wherein:
   the dispatcher is further capable of guarantying at run time that active versions of all nested components are selected at the time of top-level component instantiation.

6. The system according to claim 1, wherein:
   the at least one internal logic and/or storage of the software component can vary from version to version.

7. The system according to claim 1, wherein:
   the at least one external interface of the software component can remain backwards compatible in behavior from version to version.

8. The system according to claim 1, wherein:
   the at least one external interface of the software component can be used locally or over a network.

9. The system according to claim 1, wherein:
   the at least one external interface of the software component can be used to define Web-based applications.

10. The system according to claim 1, wherein:
    the container is capable of deploying a version of the at least one version of the software component via at least one of: registering, adding, deleting, and updating the version of the software component.

11. The system according to claim 1, wherein:
    the dispatcher is capable of identifying a version of the at least one version of the software component as active, wherein such version will become the default version to use when the software component is instantiated.

12. The system according to claim 1, wherein:
    the dispatcher is capable of performing one or more strategies to instantiate the at least one version of the software component in a dispatch cycle.

13. The system according to claim 12, wherein:
    the dispatcher is capable of performing early branch versioning by making dispatch decisions on how to instantiate a version of the at least one version of the software component early in the dispatch cycle.

14. The system according to claim 12, wherein:
    the dispatcher is capable of performing late branch versioning by making dispatch decisions on how to instantiate a version of the at least one version of the software component late in the dispatch cycle.

15. A method to manage versions of a software component, comprising:
    deploying at least one version of the software component, wherein the software component includes at least one external interface and at least one internal logic and/or storage;
    accepting a request from a client for the service of the software component;
    determining which version of the software component to instantiate;
    creating an instance of that version of the software component to serve the client;
    maintaining the instance running during a session of the service request while maintaining instances of different versions of the software component alive at the same time; and
    determining an active version that is associated with the software component with a pluggable mechanism.

16. The method according to claim 15, wherein:
    the software component can be hierarchically structured, including a top-level component and at least one nested component of the top-level component.

17. The method according to claim 16, wherein:
    creating different instances of one version of the top-level component having the same or different versions of at least one of the nested component of the top-level component.

18. The method according to claim 15, further comprising:
    allowing the at least one internal logic and/or storage of the software component to vary from version to version.

19. The method according to claim 15, further comprising:
    keeping the at least one external interface of the software component to remain backwards compatible in behavior from version to version.

20. The method according to claim 15, further comprising:
    utilizing the at least one external interface of the software component locally or over a network.

21. The method according to claim 15, further comprising:
    utilizing the at least one external interface of the software component to define Web-based applications.

22. The method according to claim 15, wherein:
    deploying a version of the at least one version of the software component by performing at least one of: registering, adding, deleting, and updating the version of the software component.

23. The method according to claim 15, further comprising:
identifying a version of the at least one version of the software component as active, wherein such version will become the default version to use when the software component is instantiated.

24. The method according to claim 15, further comprising:
performing one or more strategies to instantiate the at least one version of the software component in a dispatch cycle.

25. The method according to claim 24, wherein:
performing early branch versioning by making dispatch decisions on how to instantiate a version of the at least one version of the software component early in the dispatch cycle.

26. The method according to claim 24, wherein:
performing late branch versioning by making dispatch decisions on how to instantiate a version of the at least one version of the software component late in the dispatch cycle.

27. A machine readable storage medium having instructions stored thereon that when executed by a processor cause a system to:
deploy at least one version of the software component, wherein the software component includes at least one external interface and at least one internal logic and/or storage;
accept a request from a client for the service of the software component;
determine which version of the software component to instantiate;
create an instance of that version of the software component to serve the client;
maintain the instance running during a session of the service request while maintaining
instances of different versions of the software component alive at the same time; and
determine an active version that is associated with the software component with a pluggable mechanism.

28. The machine readable medium of claim 27, wherein:
the software component can be hierarchically structured, including a top-level component and at least one nested component of the top-level component.

29. The machine readable medium of claim 28, further comprising instructions that when executed cause the system to:
create different instances of one version of the top-level component having the same or different versions of at least one of the nested component of the top-level component.

30. The machine readable medium of claim 27, further comprising instructions that when executed cause the system to:
allow the at least one internal logic and/or storage of the software component to vary from version to version.

31. The machine readable medium of claim 27, further comprising instructions that when executed cause the system to:
keep the at least one external interface of the software component to remain backwards compatible in behavior from version to version.

32. The machine readable medium of claim 27, further comprising instructions that when executed cause the system to:
utilize the at least one external interface of the software component locally or over a network.

33. The machine readable medium of claim 27, further comprising instructions that when executed cause the system to:
utilize the at least one external interface of the software component to define Web-based applications.

34. The machine readable medium of claim 27, further comprising instructions that when executed cause the system to:
manage a version of the at least one version of the software component by performing at least one of: registering, adding, deleting, and updating the version of the software component.

35. The machine readable medium of claim 27, further comprising instructions that when executed cause the system to:
identify a version of the at least one version of the software component as active, wherein such version will become the default version to use when the software component is instantiated.

36. The machine readable medium of claim 27, further comprising instructions that when executed cause the system to:
perform one or more strategies to instantiate the at least one version of the software component in a dispatch cycle.

37. The machine readable medium of claim 36, further comprising instructions that when executed cause the system to:
perform early branch versioning by making dispatch decisions on how to instantiate a version of the at least one version of the software component early in the dispatch cycle.

38. The machine readable medium of claim 36, further comprising instructions that when executed cause the system to:
perform late branch versioning by making dispatch decisions on how to instantiate a version of the at least one version of the software component late in the dispatch cycle.

39. A computer-implemented system to manage versions of a software component, comprising:
a microprocessor;
means for deploying at least one version of the software component, wherein the software component includes at least one external interface and at least one internal logic and/or storage;
means for accepting a request from a client for the service of the software component;
means for determining which version of the software component to instantiate;
means for creating an instance of that version of the software component to serve the client;
means for maintaining the instance running during a session of the service request while maintaining instances of different versions of the software component alive at the same time; and means for determining an active version that is associated with the software component with a pluggable mechanism.

* * * * *

UNITED STATES PATENT AND TRADEMARK OFFICE
CERTIFICATE OF CORRECTION

PATENT NO. : 7,539,985 B2 Page 1 of 1
APPLICATION NO. : 10/785780
DATED : May 26, 2009
INVENTOR(S) : Kyle Marvin It is certified that error appears in the above-identified patent and that said Letters Patent is hereby corrected as shown below:

On page 3, in column 2, under "Other Publications", line 1, delete "Verfication" and insert -- Verification --, therefor.

On page 3, in column 2, under "Other Publications", line 16, delete "Implimentation" and insert -- Implementation --, therefor.

In column 1, line 53, after "invention" insert -- . --.

In column 2, line 62, after "ways" insert -- . --.

In column 5, line 3, delete "v1jws" and insert -- v1.jws --, therefor.

In column 5, line 4, delete "v2jws" and insert -- v2.jws --, therefor.

In column 5, line 5, delete "v3jws" and insert -- v3.jws --, therefor.

Signed and Sealed this

Twenty-fifth Day of May, 2010

David J. Kappos
*Director of the United States Patent and Trademark Office*